UNITED STATES PATENT OFFICE.

WILLY LOEBELL, OF KLEIN-ZSCHACHWITZ, NEAR DRESDEN, GERMANY.

PROCESS OF MAKING PLASTERS, &c.

No. 801,028.      Specification of Letters Patent.      Patented Oct. 3, 1905.

Application filed December 29, 1904. Serial No. 238,855.

*To all whom it may concern:*

Be it known that I, WILLY LOEBELL, a subject of the German Emperor, and a resident of Klein-Zschachwitz, near Dresden, in the Kingdom of Saxony and Empire of Germany, have invented certain new and useful Improvements in Processes for the Manufacture of Plasters and Bases for Ointments, Salves, and the Like, of which the following is a specification.

This invention relates to improvements in the manufacture of plasters, bases for ointments, salves, &c., and has to do particularly with plasters or bases containing viscine.

Viscine has not as yet been successfully used as a base for plasters and the like owing to the difficulty encountered in preserving the plasters in a soft and plastic condition while in use. This defect has resulted from the use of volatile solvents in initially treating the ingredient of the plaster or salve. In using benzin as a solvent the plaster after being applied to the body soon becomes hard and brittle, losing the properties of adhesiveness, toughness, and pliability. A plaster in this condition does not exclude the air and, further, forms a hard mass adhering only in parts to the surface to which it is applied, thereby failing entirely to effectively perform its function. In the use of salves and ointments containing viscine treated by volatile solvents, such as benzin, the mass applied soon hardens and cracks, admitting the air to the wound and requiring frequent renewal of the salve. Furthermore, the employment of a volatile solvent in preparations of this nature requires that the original package must be put up and carefully sealed, whereas with non-volatile solvents the cost of putting the preparation in marketable packages is greatly lessened.

By means of my improved process I am enabled to use viscine in the manufacture of plasters, salves, and the like in a manner to fully utilize its curative and other valuable medicinal properties. This result is attained by treating the viscine and other constituents that may be added in a manner to preserve the finished product, if it be a plaster, in a soft pliable condition to cause the same readily to adhere and tightly cling to the surface to which it is applied.

To this end my improved process consists generally in the addition to viscine of a suitable non-volatile solvent—such, for instance, as the petroleum products, fats, waxes, resins, gum-resins or camphor—and in subsequently mixing the same thoroughly. The mixture is then subjected to a steam-bath and heated to a temperature of approximately 100° centigrade. For the manufacture of a base for salves or ointments sixty grams of viscine and a non-volatile solvent, preferably vaseline, are mixed in proportions of, say, forty grams of the latter, the resulting mass being heated for a suitable time over a steam or water bath and subjected to the required agitation. The resulting product is then in a marketable state. The proportions may of course be varied in accordance with the nature of the plasters or ointments and the purposes for which the same are to be used. These changes, however, are in view of the disclosure made clearly within the province of the skilled chemist or pharmacist.

The resulting product has the very valuable property of excluding air and inducing the rapid healing of wounds due to burns and can be very conveniently applied to moist wounds, such as eczema and the like. The product readily forms emulsions with various liquids and is not attacked by cold water. When the product is used as a plaster, it can be very readily removed from the surface to which it is applied by the application thereto of a warm soap solution, the aid of benzin, ether, or alcohol, which act as irritants and are at present required for the removal of known plasters being thus avoided.

What I claim is—

1. The herein-described process consisting in the addition to viscine of a non-volatile solvent and in subsequently subjecting the mixture to the application of heat and agitation.

2. The herein-described process consisting in the addition to viscine of vaseline and in subsequently subjecting the mixture to a steam or water bath and the required agitation.

In testimony whereof I affix my signature in presence of two witnesses.

WILLY LOEBELL.

Witnesses:
    MORRIS LIPMAN,
    FREDERICK J. DIETZMAN.